Jan. 19, 1960 F. D. SHER 2,921,991

MAGNETIC RECORDER

Filed April 27, 1956

INVENTOR.

FRED D. SHER

BY Ernest Fanwick
attorney

United States Patent Office 2,921,991

Patented Jan. 19, 1960

2,921,991

MAGNETIC RECORDER

Fred D. Sher, New York, N.Y., assignor to ACF Industries, Incorporated, New York, N.Y., a corporation of New Jersey Application April 27, 1956, Serial No. 581,176

13 Claims. (Cl. 179—100.2)

Figures 1, 2:
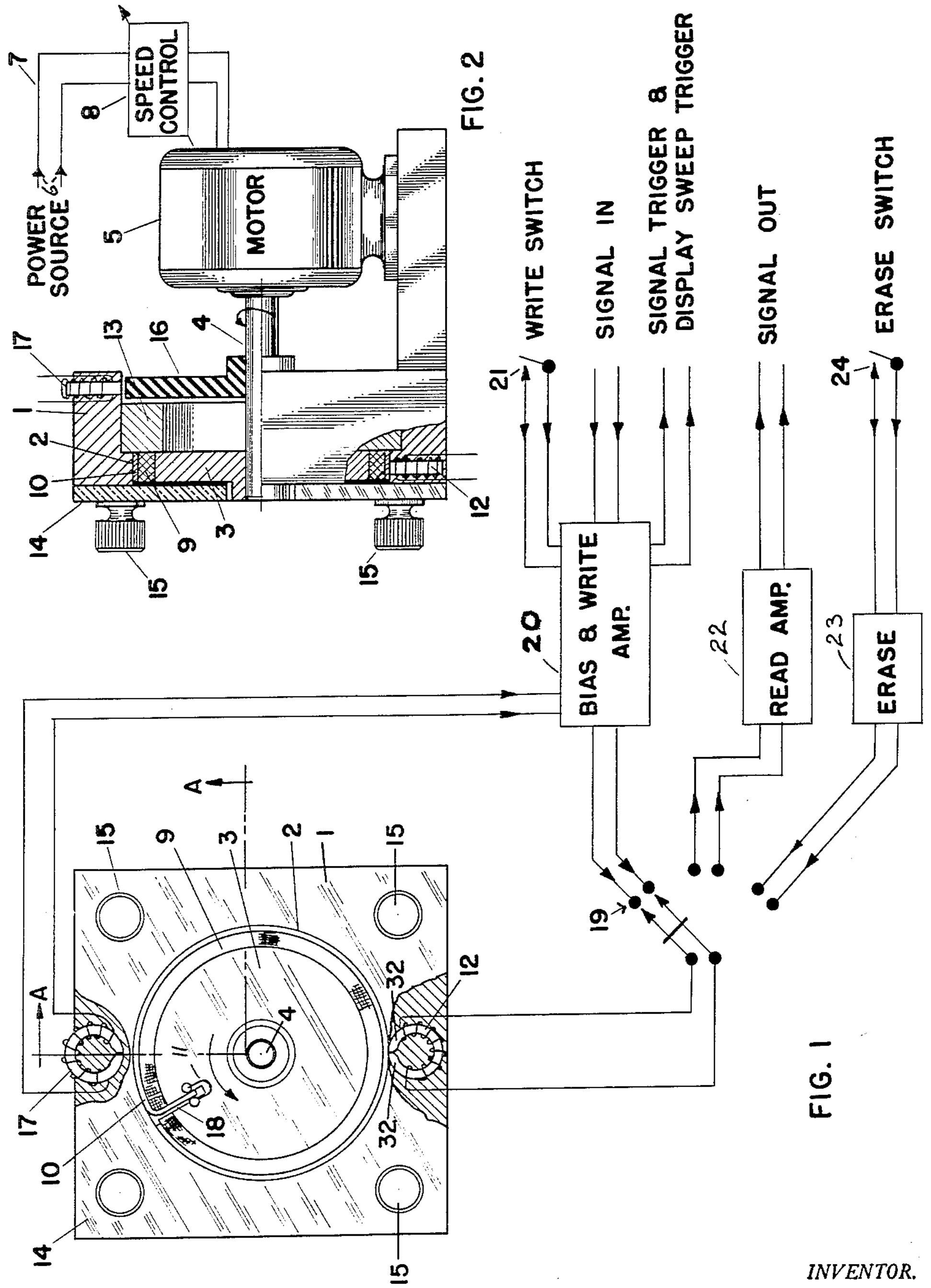

This invention relates to magnetic recorders and, more particularly, to high speed magnetic recorders, utilizing a magnetic tape for the recording of high frequencies.

The two most widely used magnetic recording media are the magnetic recording tape and the magnetic recording drum. Each of these recording materials requires a different recording medium transport system and each is designed to accomplish different functions. Magnetic recording systems using wire or tape as the magnetizable recording medium are particularly suitable for recording relatively low frequency signals of long-time duration; such as music, speech or telemetering signals. During recording, the tape is caused to travel past a recording head from a storage reel to a take-up reel. In general, the tensile strength of the magnetic recording tape is rather low, so they are not strong enough to stand the pull necessary for high speed motion. This is particularly true in those tapes presently in use which have extremely small cross sectional area in order to reduce storage volume for a given recording time. Since the speed of travel of the tape or recording medium past the recording head is limited, an upper limit is placed on the highest frequency which can be recorded. One distinct advantage of recording tape is that it may be removed from the recording machine and conveniently kept as a permanent record of the recorded signals and, at a later time, reinserted in the machine for reproduction or reuse.

The other major recording system in wide use utilizes a magnetic drum or a drum coated with a magnetic recording material, which is rotated at extremely high speeds past the recording head, allowing high frequency signals or high repetition rate pulses or transient effects to be recorded. The magnetic coating on the periphery of the drum is the actual recording medium and is an integral part of the rotating drum which, in turn, is normally an integral part of the recording machine. In general, the recording drum is not removed from the recording machine or even if it is so removed, the large storage volume necessary for each drum makes the permanent storage of the recorded signal impractical and, thus, no permanent record of the drum recorded signal is usually maintained. One other disadvantage of a recording drum system is the fact that almost all drums must vary somewhat from a perfectly circular peripheral orbit during rotation and, thus, non-contacting recording means must be used in conjunction with the drums. While contacting recording means can be used in tape recorders due to their lesser speed, non-contact recording means, which must be used with drums, results in a lower compacting factor of recorded signals so that the highest frequency which can be recorded on a drum, is actually lower than that corresponding to the increase of the recording medium speed of the drum over the speed of the tape where contact recording is used. Non-contact recording on a drum, which is spinning in a non-perfect path, also produces spurious amplitude modulation of the signal.

One suggested solution for the non-perfect drum problem, which yields an improved record, is the use of a compliant recording head which maintains contact between the recording means and the periphery of the recording drum. This solution, while overcoming the disadvantage of a recording drum, does not take advantage of the desirable characteristics of tape recording.

One of the objects of the present invention is to provide a magnetic recording system which combines the advantages of magnetic tape and drum recording systems.

Another object of my invention is to provide a magnetic recorder, utilizing the readily available and inexpensive magnetic recording tape as the recording medium, which is transported past the recording means over a wide range of recording speeds, including those now currently possible only in drum recorders.

Still another object of my invention is the use of a compliant drum in a magnetic recording system, which allows contact recording between the recording head and the recording medium.

One of the features of my invention is a magnetic recording system, utilizing magnetic recording tape as the recording medium and a compliant drum as the transport medium. The drum is located inside a cylindrical housing and the recording heads are disposed to form an integral part of the internal surface of the cylinder. By causing the tape to be carried past the recording head, the centrifugal force maintains the tape and recording head in contact. A compliant surface on the transport drum assists in maintaining contact between the head and tape, and high frequency signals can be recorded with packing factors comparable with those achieved in tape recorders and with a minimum of amplitude modulations. In order to provide for proper reproduction of the signal when the tape is reinserted in the recording system, a synchronizing system is provided.

The above-mentioned and other objects and features of this invention, and the manner of attaining them, will become more apparent by reference to the following description taken in conjunction with the accompanying drawings, in which:

Fig. 1 is a schematic drawing, partly in block form, of a front elevational view of the magnetic recorder of my invention and its associate circuitry; and Fig. 2 is a side elevational view partly in section along the broken line A—A of the embodiment of a magnetic recorder shown in Fig. 1.

Referring to Fig. 1 of the drawing, one embodiment of a magnetic recorder, in accordance with the principles of my invention, is shown to comprise a cylindrical housing 1, having at one end a dimension internal annular cylindrical surface opening 2. A drum 3 is disposed within the cylindrical opening 2 in the housing 1 and is mounted on a rotating shaft 4, which is driven by a motor 5. A source of power 6 is coupled over line 7 and through a motor speed control 8 to the motor 5. The surface of the cylindrical opening 2 in the housing 1 is concentric with and of a slightly larger diameter than the drum 3. The periphery of the drum 3 is covered with a compliant or cushioning material 9 which may be, for example, felt or velvet cloth. A magnetic recording tape 10 is clamped on the drum 1 by a spring or clamping means 11 and is positioned and located between the compliant material 9 and the internal surface of the cylindrical opening 2 in the housing 1. The magnetic tape 10 is of sufficient length to substantially surround the drum 3. The direction in which the tape 10 is wound about the drum 3 is dependent upon the direction of the rotation of the shaft 4. As shown in Fig. 1, the drum 3 is assumed to be rotated in a counter-clockwise direction. A magnetic recording transducer head 12 is disposed in the housing 1 in such a manner that its pole ends form an integral part of the continuous internal cylindrical surface of opening 2. The entire surface opening 2 is machined, ground and polished to reduce to a minimum the wear on the tape 10 as it slides over surface 2. The tape 10 is restrained from motion in the axial direction by means of a magnetic tape guide ring 13 and a front cover plate 14, which is cut away in Fig. 1 to permit a view of tape 10. The front cover plate 14 may be made of a transparent material, such as glass, and held in position by means of screws 15. It is apparent that the space between the front cover plate 14 and the tape guide ring 13 should be the nominal width of the recording tape, plus the necessary minimum clearance.

In order to synchronize the recording and reproducing of the signals, a synchronizing system is utilized comprising a synchronizing drum 16 and a synchronizing signal magnetic pickup head 17, which is disposed within the housing 1. The synchronizing drum 16 and the synchronizing signal pickup head 17 are located adjacent to each other so that the peripheral surface of drum 16 passes under the pole tips of synchronizing signal pickup head 17. Any one of a variety of commonly used methods for the deriving of a synchronizing signal for each revolution of the drum can be utilized; for example, a scratch may be put into the peripheral surface of the synchronizing drum 16 and the scratch filled with magnetic material, which is magnetized and induces a pulse in the synchronizing pickup head 17 each time it passes beneath the pickup head 17.

The operation of the magnetic recorder of my invention is initiated by taking out screws 15 and removing the front cover plate 14. When the cover plate 14 is removed, a length of tape having a length at least equal to the circumference of the drum 3 has one end inserted in the clamping slot 18 where it is secured by means of the springs or clamps 11. The tape is wrapped around drum 3 with the free end of the tape positioned adjacent to slot 18. The power from source 6 is connected to the motor 5 and its speed is adjusted by means of control 8. Selector switch 19 couples the output of amplifier 20 to the recording head 12. The signal to be recorded is coupled as the input to the amplifier 20. When it is desired to record, the write switch 21 is closed. The next time the magnetic pickup head 17 couples a pulse to the amplifier 20, the signal input is coupled to the recording head 12. The next synchronizing signal decouples the signal input from the recording head 12.

Thus, it is seen that since, in general, it is desirable to record a transient signal only for the length of time equal to the rotational period of the driving motor 5, which may be varied by using speed control 8, the circuitry is so arranged that, when the switch 19 is coupled to the write circuitry 20, recording takes place only between the next two successive synchronizing pulses obtained from the output of the synchronizing head 17. The tape 10 and drum 3 and the synchronizing drum 16 are so disposed and phased that a synchronizing pulse is obtained from the synchronizing recording head 17 when the end of the tape 10, held in slot 18 of drum 3, passes under the magnetic recording head 12. After the signal has been recorded on the tape, the tape may be removed and stored as a permanent record of the signal. In order to read out the signal recorded on the tape 10, the tape 10 is again placed in the slot 18 and positioned on the periphery of the transport drum 3. Switch 19 is coupled to the mid or read position, connecting the recorder head 12 to the read amplifier 22. In this position, reading is initiated when the synchronizing pickup head 17 generates a synchronizing pulse. This pulse is fed into amplifier 20 and is used as a trigger signal to initiate the display sweep of a cathode ray oscilloscope to which the output of amplifiers 20 and 22 are coupled. If the operator desires, the readout may continue for a plurality of cycles or rotations of drum 3 and, through the repetition of the recorded signal, correlation may be utilized to enhance the readability of the recorded signal.

In order to reuse the tape 10, it is merely necessary to couple switch 19 to the erase circuitry 23 and, as is usual with magnetic recorders, the previously recorded signals are eliminated from the tape 10, which is then ready for reuse.

Due to the compliant layer 9 under the tape 10, the drum 3 is essentially compliant, causing the tape 10 to be in continuous contact with the recording head 12. This is an important feature of the transporting mechanism, which presents flexing of the tape 10 even at high linear tape speeds. In addition to the velvet or felt surface layer 9, forcing the tape 10 against the recording head 12, the fast rotational speed of the transporting mechanism causes centrifugal force exerted on the tape to maintain a close contact between tape 10 and recording head 12.

It is apparent that the magnetic recorder of my invention may take many forms, such as various other means for restraining the tape from axial motion or other means for clamping the tape to the drum periphery or even in the construction of the transporting mechanism itself. More than a single recording head may be utilized on a multitrack tape and more reliance may be placed upon the dynamic forces for maintaining the tape against the recording head, eliminating the need for the cushioned base under the tape.

While I have described above the principles of my invention in connection with specific apparatus, it is to be clearly understood that this description is made by way of example only and not as a limitation to the scope of my invention as set forth in the objects thereof and in the accompanying claims.

I claim:

1. An apparatus for the magnetic recording and reproducing of electrical signals comprising the combination of a magnetizable recording tape, a rotatable drum, means to attach said tape to the periphery of said drum, a transducer head disposed adjacent the periphery of said drum in magnetic flux linkage relationship with said tape, a housing having an internal cylindrical surface, and means to rotate said drum and transport said tape in sliding contact engagement against said surface and said transducer head.

2. An apparatus for the magnetic recording and reproducing of electrical signals according to claim 1, wherein the periphery of said drum includes a compliant surface layer to resiliently support said tape.

3. An apparatus for the magnetic recording and reproducing of electrical signals comprising the combination of a magnetizable recording tape, a transport drum, means to attach one end of said tape to the periphery of said drum, a housing having an internal cylindrical surface, means rotatably mounting said drum within said housing, a transducer head comprising a portion of said internal surface, said transducer head being disposed adjacent the periphery of said drum in magnetic flux linkage relationship with said tape, and means to rotate said drum and transport said tape in sliding contact engagement against said surface and said transducer head.

4. Apparatus according to claim 3 wherein said drum further includes a compressible surface layer to exert a force urging said tape radially toward said surface and said head.

5. Magnetic recording apparatus comprising a housing having an internal cylindrical surface therein, a magnetizable recording tape, a transducer head including pole pieces and comprising a portion of internal surface, and means to transport said tape in sliding contact engagement with said inner surface and said pole pieces.

6. Apparatus according to claim 5 wherein said means to transport said tape includes a rotary drum, means to position said tape on the periphery of said drum, and means to rotate said drum, whereby said tape is urged by centrifugal force into sliding contact with said pole pieces.

7. A magnetic recording system comprising the combination of a magnetizable recording tape, a transport drum, means to attach one end only of said tape to the periphery of said drum, a housing having an internal cylindrical surface, a shaft rotatably supporting said transport drum within and coaxial with said surface, a transducer head having pole pieces forming a portion of said surface adjacent the periphery of said transport drum in magnetic flux linkage relationship with said tape, a synchronizing drum fixed on said shaft, means to generate synchronizing signals responsive to said synchronizing drum, and means to rotate said shaft, whereby said tape is maintained in sliding contact engagement with said cylindrical surface and pole pieces by centrifugal force.

8. An apparatus for recording electrical signals on magnetizable recording tape, a housing having an internal cylindrical surface provided with a radial opening therein, a transducer head positioned within said opening, and a drum journaled for rotational movement within said housing to move a recording tape in sliding contact engagement along said cylindrical surface and said transducer head.

9. The apparatus of claim 8 including means for detachably connecting one end of a tape to said drum.

10. The apparatus of claim 9 including means to rotate said drum, whereby a tape is urged into sliding contact engagement with said transducer head by centrifugal force.

11. An apparatus according to claim 8 wherein said drum comprises a compliant surface layer to support a tape.

12. An apparatus for recording electrical signals on magnetizable recording tape, a housing having an internal annular surface provided with a radial opening therein, a transducer head having pole pieces positioned within said opening, and a drum journaled for rotational movement within said housing to move a recording tape in sliding contact engagement along said annular surface and said transducer head pole pieces.

13. An apparatus according to claim 9 including synchronizing means to generate a signal to indicate the position of one end of a tape relative to the transducer head.

References Cited in the file of this patent

UNITED STATES PATENTS

| | | |
|---|---|---|
| 2,540,654 | Cohen et al. | Feb. 6, 1951 |
| 2,645,495 | Keller | July 14, 1953 |
| 2,683,038 | Saliba et al. | July 6, 1954 |
| 2,695,785 | Dashiell et al. | Nov. 30, 1954 |
| 2,708,693 | Hendrickson | May 17, 1955 |
| 2,709,597 | Stroobants | May 31, 1955 |
| 2,710,191 | Williams | June 7, 1955 |
| 2,714,010 | Gruber et al. | July 26, 1955 |
| 2,743,317 | Roberts | Apr. 24, 1956 |
| 2,745,944 | Bobb | May 15, 1956 |
| 2,820,688 | Philbrick | Jan. 21, 1958 |

FOREIGN PATENTS

| | | |
|---|---|---|
| 657,494 | Great Britain | Sept. 19, 1951 |